US011163253B2

(12) United States Patent
Ishido

(10) Patent No.: US 11,163,253 B2
(45) Date of Patent: Nov. 2, 2021

(54) IMAGE FORMING APPARATUS

(71) Applicant: KYOCERA Document Solutions Inc., Osaka (JP)

(72) Inventor: Kohei Ishido, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 17/105,705

(22) Filed: Nov. 27, 2020

(65) Prior Publication Data

US 2021/0173334 A1    Jun. 10, 2021

(30) Foreign Application Priority Data

Dec. 6, 2019   (JP) .............................. JP2019-221154

(51) Int. Cl.
*G03G 15/00* (2006.01)

(52) U.S. Cl.
CPC ..... *G03G 15/5058* (2013.01); *G03G 15/5012* (2013.01); *G03G 15/5041* (2013.01)

(58) Field of Classification Search
CPC ........... G03G 15/5058; G03G 15/5012; G03G 15/5041
See application file for complete search history.

(56) References Cited

U.S. PATENT DOCUMENTS

| 11,032,443 | B2 * | 6/2021 | Kanaya | ................. H04N 1/4076 |
| 2003/0090742 | A1 * | 5/2003 | Fukuda | ................. H04N 1/4097 |
| | | | | 358/448 |
| 2006/0177254 | A1 * | 8/2006 | Mihara | ...................... B41J 3/60 |
| | | | | 399/401 |
| 2007/0285743 | A1 * | 12/2007 | Hirayama | ............ H04N 1/6033 |
| | | | | 358/504 |
| 2007/0291324 | A1 * | 12/2007 | Kamei | ............... H04N 1/00909 |
| | | | | 358/474 |
| 2010/0309530 | A1 * | 12/2010 | Kamei | ............... H04N 1/00734 |
| | | | | 358/474 |
| 2012/0044515 | A1 * | 2/2012 | Ikegawa | .............. H04N 1/0005 |
| | | | | 358/1.13 |
| 2017/0353611 | A1 * | 12/2017 | Koyama | .............. H04N 1/4092 |
| 2020/0329158 | A1 * | 10/2020 | Takura | ............... H04N 1/00087 |
| 2021/0053353 | A1 * | 2/2021 | Gardner | ................. B41J 2/1753 |

FOREIGN PATENT DOCUMENTS

| JP | 2004-069805 |   | 3/2004 |
| JP | 2011010050 A | * | 1/2011 |
| JP | 2020001192 A | * | 1/2020 |

* cited by examiner

*Primary Examiner* — Sevan A Aydin
(74) *Attorney, Agent, or Firm* — Lex IP Meister, PLLC

(57) ABSTRACT

An image forming apparatus includes a paper transport unit, an image forming unit, a reading unit, a foreign matter detection signal generation circuit, and a foreign matter detection control circuit. The foreign matter detection signal generation circuit generates a first foreign matter detection signal, based on an analog image signal to be output from a line sensor. In foreign matter detection processing, when a pixel that reads foreign matter continues by a specific first consecutive number or more in a signal based on the analog image signal of each pixel to be output from the line sensor, the foreign matter detection signal generation circuit sets a level of the first foreign matter detection signal to a level indicating the presence of foreign matter.

11 Claims, 9 Drawing Sheets

IMAGE FORMING APPARATUS

INCORPORATION BY REFERENCE

This application is based upon, and claims the benefit of priority from, corresponding Japanese Patent Application No. 2019-221154 filed in the Japan Patent Office on Dec. 6, 2019, the entire contents of which are incorporated herein by reference.

BACKGROUND

Field of the Invention

The present disclosure relates to an image forming apparatus that transports paper and reads the paper to be transported.

Description of Related Art

An image forming apparatus transports paper in the apparatus, and forms an image on the paper to be transported. When a posture or a position of the paper to be transported is displaced, the image may not be printed properly. In view of the above, an image sensor for reading transport paper may be installed inside the image forming apparatus. For example, an image sensor is provided in an image forming apparatus such as a printer or a complex machine. It is possible to check a paper transport state from image data acquired by reading with use of the image sensor.

The image sensor itself is stored in a housing of a reading unit. By storing the image sensor, it is possible to prevent dust from directly adhering to the image sensor. One surface of the housing serves as a light transmitting plate like a glass plate. The image sensor receives light to be transmitted through the light transmitting plate, and reads a reading target (transport paper).

Foreign matter may adhere to the light transmitting plate. Foreign matter may cause erroneous detection of a paper transport state. For example, foreign matter is dust, paper dust, and toner particles. There is a difference in the level of an analog image signal to be output from the image sensor between a pixel (light receiving element) that reads foreign matter, and a pixel that reads a portion where foreign matter is not present. A pixel that reads foreign matter can be detected based on the level of an analog image signal. For example, an analog image signal of the image sensor is input to a control circuit such as a CPU. The control circuit monitors a change in the analog image signal, and determines the presence or absence of foreign matter. When it is determined that foreign matter is present, for example, the control circuit causes to display a message urging cleaning.

In recent years, resolution of an image sensor has been increasing. Therefore, minute foreign matter can be detected. As a result, an analog image signal whose level changes greatly many times may be input to the control circuit. When the number of times of level changes of an input signal is too large, processing load of the control circuit that monitors may increase. It is necessary to use an expensive control circuit having a high processing speed to prevent occurrence of processing delay, even when the analog image signal is monitored.

In addition, when the presence of minute foreign matter having a size of about one pixel is detected, it is difficult to determine whether cleaning work should be requested to a user. As far as foreign matter is minute, it may not affect printing. If cleaning work is requested just because minute foreign matter is detected, the frequency of requesting cleaning work may become too high. This may impose unnecessarily heavy work load on the user.

There is an idea of decreasing a level change of an analog image signal by an inexpensive filter circuit using a capacitor and a resistor. This may reduce the number of times of large level changes of the analog image signal. However, use of such a filter circuit may delay detection of paper being a reading target. In addition, it is necessary to consider a variation in the capacitance of the capacitor and a variation in the resistance value of the resistor.

SUMMARY

An image forming apparatus according to the present disclosure includes a paper transport unit, an image forming unit, a reading unit, a foreign matter detection signal generation circuit, and a foreign matter detection control circuit. The paper transport unit transports paper. The image forming unit forms an image. The reading unit includes a lamp and a line sensor for reading transport paper. The reading unit is provided on an upstream side in a paper transport direction with respect to the image forming unit. The foreign matter detection signal generation circuit generates a first foreign matter detection signal, based on an analog image signal to be output from the line sensor. The foreign matter detection control circuit receives the first foreign matter detection signal. The foreign matter detection control circuit recognizes the presence or absence of foreign matter in the reading unit, based on a level of the first foreign matter detection signal. In foreign matter detection processing, when a pixel that reads foreign matter continues by a specific first consecutive number or more in a signal based on the analog image signal of each pixel to be output from the line sensor, the foreign matter detection signal generation circuit sets a level of the first foreign matter detection signal to a level indicating the presence of foreign matter. Even if there is a pixel that reads foreign matter in the signal based on the analog image signal of each pixel to be output from the line sensor, when a pixel that reads foreign matter does not continue by the first consecutive number or more, the foreign matter detection signal generation circuit sets a level of the first foreign matter detection signal to a level indicating the absence of foreign matter.

DETAILED DESCRIPTION

In the following, an image forming apparatus according to an embodiment is described with reference to FIGS. 1 to 12. A complex machine 100 is described as an example of the image forming apparatus. The complex machine 100 can print and transmit based on image data. Each element such as a configuration and an arrangement described in the description of the present embodiment does not limit the scope of the disclosure and is merely an example of description.

(Complex Machine 100)

Figure 1:
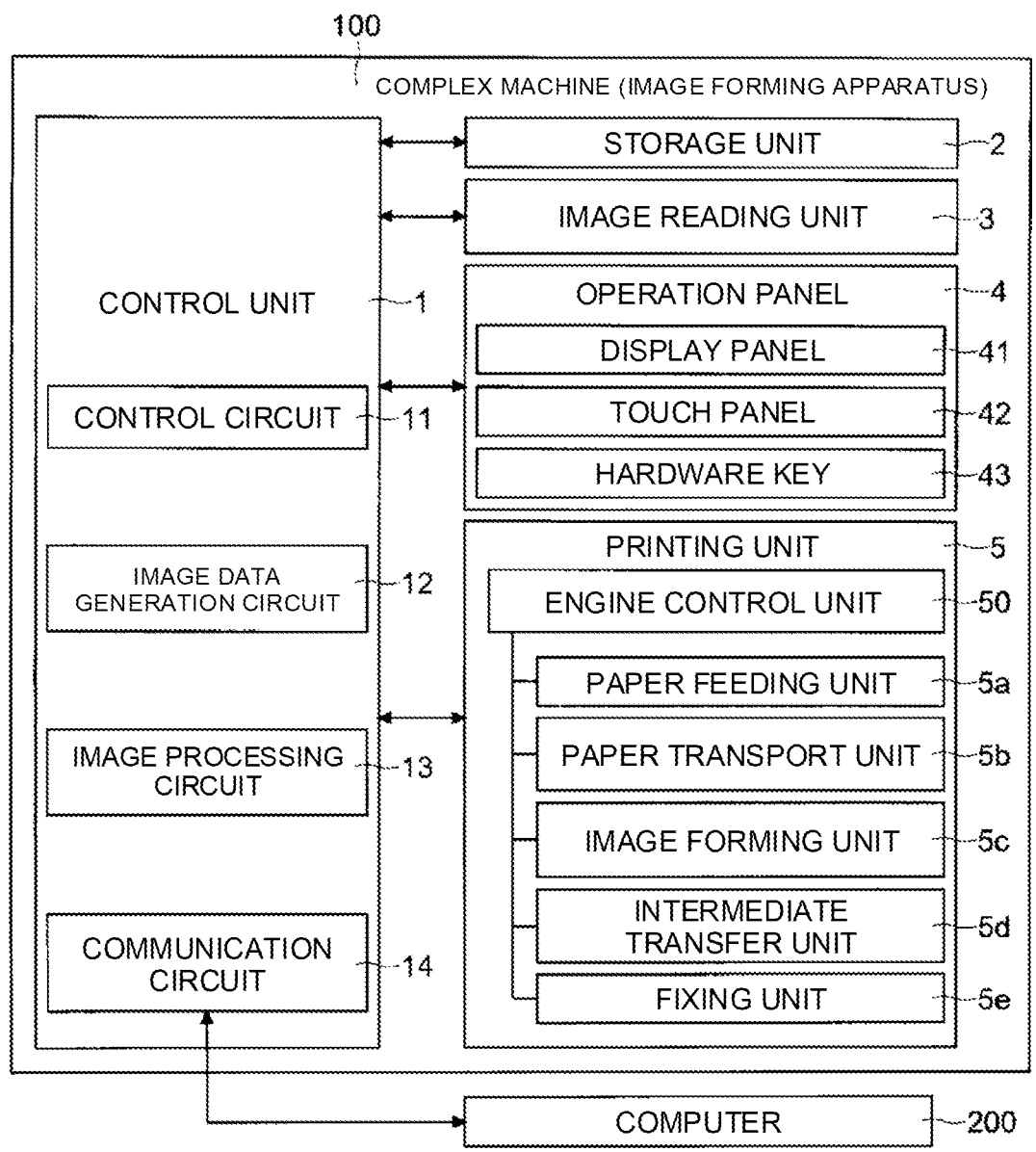
FIG. 1 is a diagram showing one example of a complex machine according to an embodiment.
Figure 2:
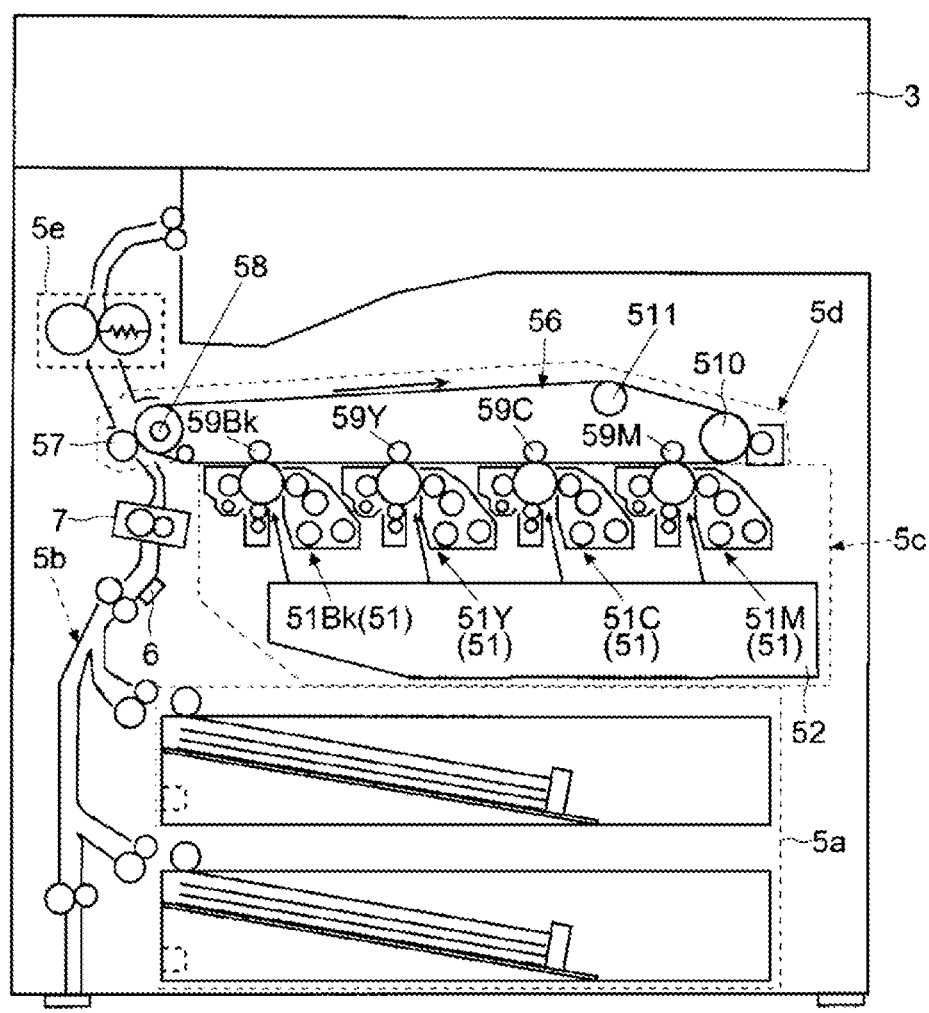
FIG. 2 is a diagram showing one example of the complex machine according to the embodiment.
Figure 3:
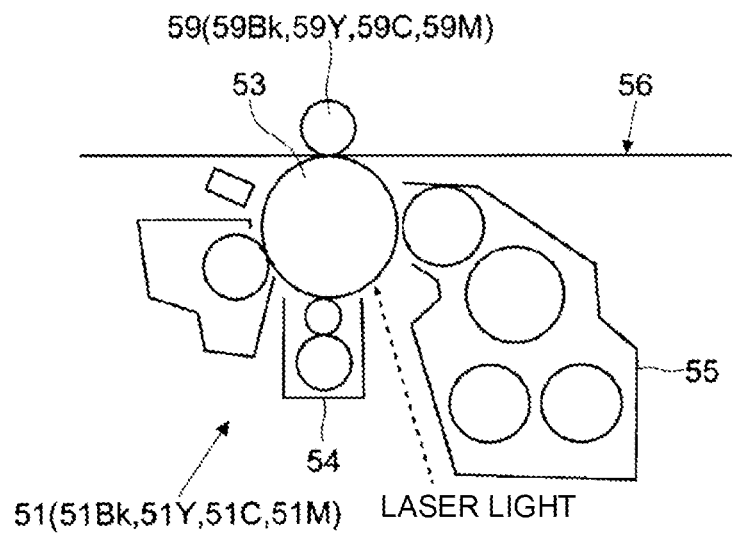
FIG. 3 is a diagram showing one example of an image forming unit according to the embodiment.

The complex machine 100 according to the embodiment is described with reference to FIGS. 1 to 3. FIGS. 1 and 2 are diagrams showing one example of the complex machine 100 according to the embodiment. FIG. 3 is a diagram showing one example of an image forming unit 5c according to the embodiment.

As shown in FIG. 1, the complex machine 100 includes a control unit 1, a storage unit 2, an image reading unit 3, an operation panel 4, and a printing unit 5.

The control unit 1 controls an operation of the complex machine 100. The control unit 1 controls an operation of a job such as copying and transmission. The control unit 1 includes a control circuit 11, an image data generation circuit 12, an image processing circuit 13, and a communication circuit 14. For example, the control circuit 11 is a CPU. The control circuit 11 performs processing and calculation relating to a job. For example, the image data generation circuit 12 includes an A/D conversion circuit. The image data generation circuit 12 processes an output analog image signal acquired by reading a document by the image reading unit 3, and generates document image data. The image processing circuit 13 is an integrated circuit (for example, ASIC) for image processing. The image processing circuit 13 performs image processing of the document image data.

For example, the communication circuit 14 includes a communication control circuit and a communication memory. The communication control circuit controls communication. The communication memory stores a communication software. The communication circuit 14 communicates with a computer 200. For example, the computer 200 is a PC or a server. The operation panel 4 accepts destination setting. The control unit 1 causes the communication circuit 14 to transmit image data based on document reading toward a set destination (scan transmission). In addition, the communication circuit 14 receives printing data from the computer 200. The control unit 1 causes the printing unit 5 to print based on the received printing data (print job).

The storage unit 2 includes RAM, ROM, and a storage. For example, the storage is an HDD or an SSD. The control unit 1 controls each unit, based on a program and data in the storage unit 2. The image reading unit 3 includes a light source and an image sensor. The image reading unit 3 reads a document.

The operation panel 4 accepts user's settings. The operation panel 4 includes a display panel 41, a touch panel 42, and a hardware key 43. The control unit 1 causes the display panel 41 to display a message and a setting screen. The control unit 1 causes the display panel 41 to display an operation image. For example, the operation image is a button, a key, or a tab. The control unit 1 recognizes the operated operation image, based on an output from the touch panel 42. The hardware key 43 includes a start key and a numeric keypad. The touch panel 42 and the hardware key 43 accept a user's setting operation (operation relating to a job). For example, the operation panel 4 accepts settings on a document reading mode. The control unit 1 recognizes a setting content, based on an output from the operation panel 4.

The complex machine 100 includes the printing unit 5. The printing unit 5 includes an engine control unit 50, a paper feeding unit 5a, a paper transport unit 5b, the image forming unit 5c, an intermediate transfer unit 5d, and a fixing unit 5e. The engine control unit 50 includes an engine control circuit 50a (engine CPU) and an engine memory 50b (see FIG. 7). The engine memory 50b stores a program and data for printing control. The engine control unit 50 controls an operation of the paper feeding unit 5a, the paper transport unit 5b, the image forming unit 5c, the intermediate transfer unit 5d, and the fixing unit 5e, based on a printing instruction from the control unit 1. The engine control circuit 50a performs control, based on the program and the data stored in the engine memory 50b.

For example, the paper feeding unit 5a includes a paper cassette in which paper is stored, and a paper feed roller that feeds the paper. When printing, the engine control unit 50 causes the paper feeding unit 5a to supply paper. For example, the paper transport unit 5b includes a motor, a transport roller pair, and a paper transport path. The engine control unit 50 causes the paper transport unit 5b to transport the paper fed from the paper feeding unit 5a. The paper transport unit 5b transports the paper inside the machine (causes the paper to pass through the paper transport path).

The image forming unit 5c forms an image (toner image). As shown in FIGS. 2 and 3, the image forming unit 5c includes an image forming unit 51 and an exposure device 52 by the number corresponding to four colors. The complex machine 100 includes an image forming unit 51Bk that forms a black image, an image forming unit 51Y that forms a yellow image, an image forming unit 51C that forms a cyan image, and an image forming unit 51M that forms a magenta image. The colors of the toner images to be formed by the image forming units 51Bk to 51M are different. However, the configuration of each of the image forming units 51Bk to 51M is basically the same. Therefore, in the following explanation, symbols Bk, Y, C, and M of the image forming units 51 are omitted unless otherwise specified.

Each of the image forming units 51 includes a photoconductor drum 53, a charging device 54, and a developing device 55. When printing, the engine control unit 50 rotates a drum motor (not shown) to rotate the photoconductor drum 53. The engine control unit 50 causes the charging device 54 to charge the photoconductor drum 53. Also, the engine control unit 50 causes the exposure device 52 to expose the photoconductor drum 53. The developing device 55 accommodates a developing agent including toner. The engine control unit 50 causes the developing device 55 to develop an electrostatic latent image of toner on the photoconductor drum 53.

The intermediate transfer unit 5d includes an intermediate transfer belt 56, a secondary transfer roller 57, a drive roller 58, primary transfer roller 59Bk, 59Y, 59C, 59M, and driven roller 510, 511. An axial direction of each of the tension rollers is aligned in parallel. The intermediate transfer belt 56 is endless. The intermediate transfer belt 56 is wound around the tension rollers. The intermediate transfer unit 5d (intermediate transfer belt 56) receives primary transfer of a toner image from the photoconductor drum 53. Then, the intermediate transfer unit 5d performs secondary transfer of the toner image to the paper.

For example, the fixing unit 5e includes a heater and a fixing roller. The engine control unit 50 heats and pressurizes the paper on which the toner image is transferred against the fixing roller. The engine control unit 50 causes the fixing unit 5e to fix the toner image. The paper transport unit 5b discharges the paper after fixation to the outside of the machine (onto a discharge tray).

(Reading Unit 6 and Non-Registration Unit 7)

Figure 4:
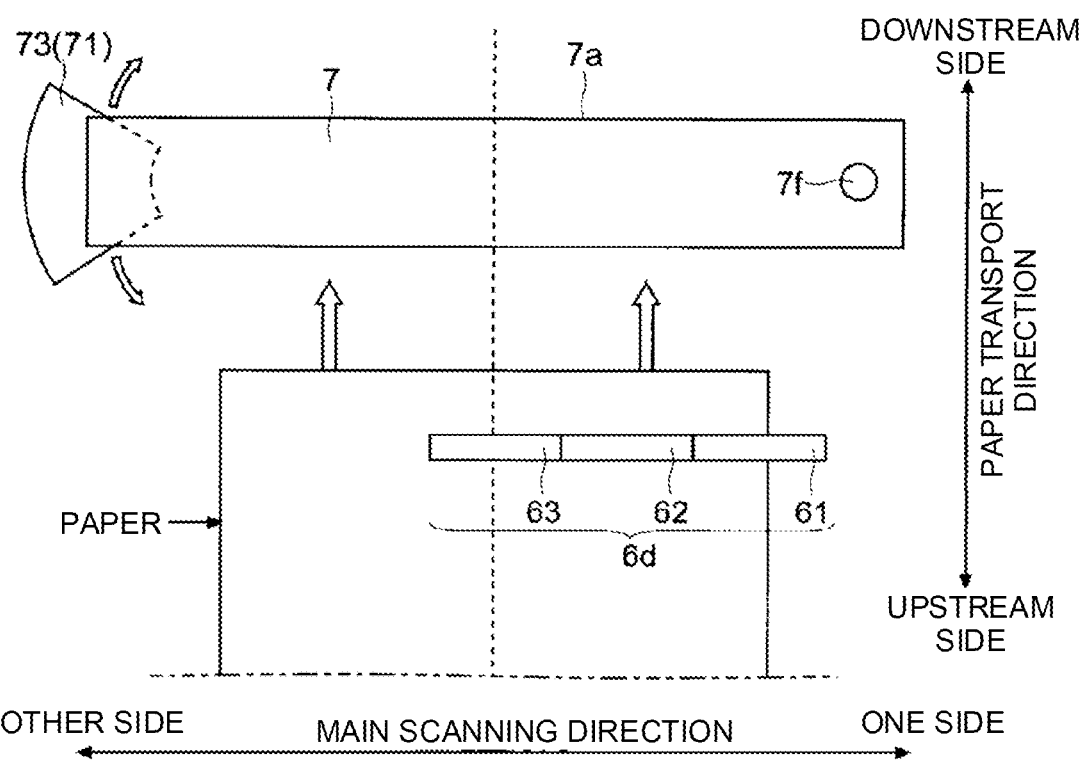
FIG. 4 is a diagram showing one example of the image forming unit according to the embodiment on an upstream side in a paper transport direction.
Figure 5:
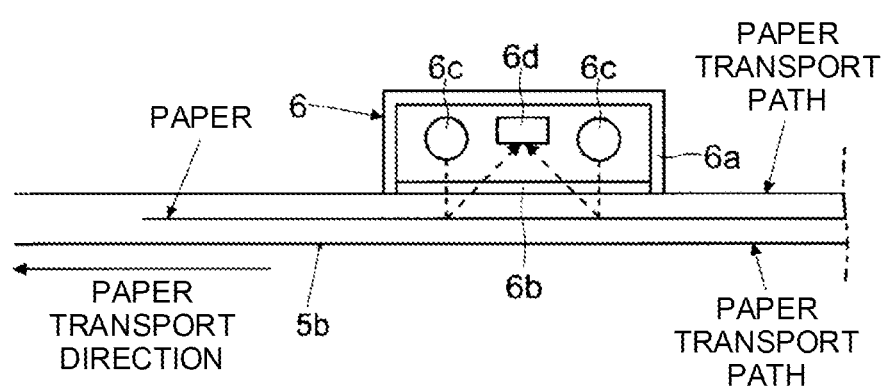
FIG. 5 is a diagram showing one example of a reading unit according to the embodiment.
Figure 6:
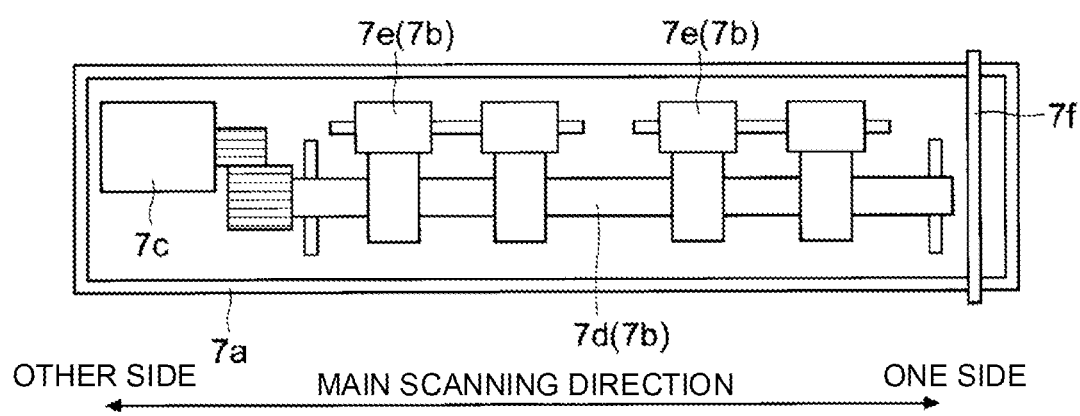
FIG. 6 is a diagram showing one example of a non-registration unit according to the embodiment.
Figure 7:
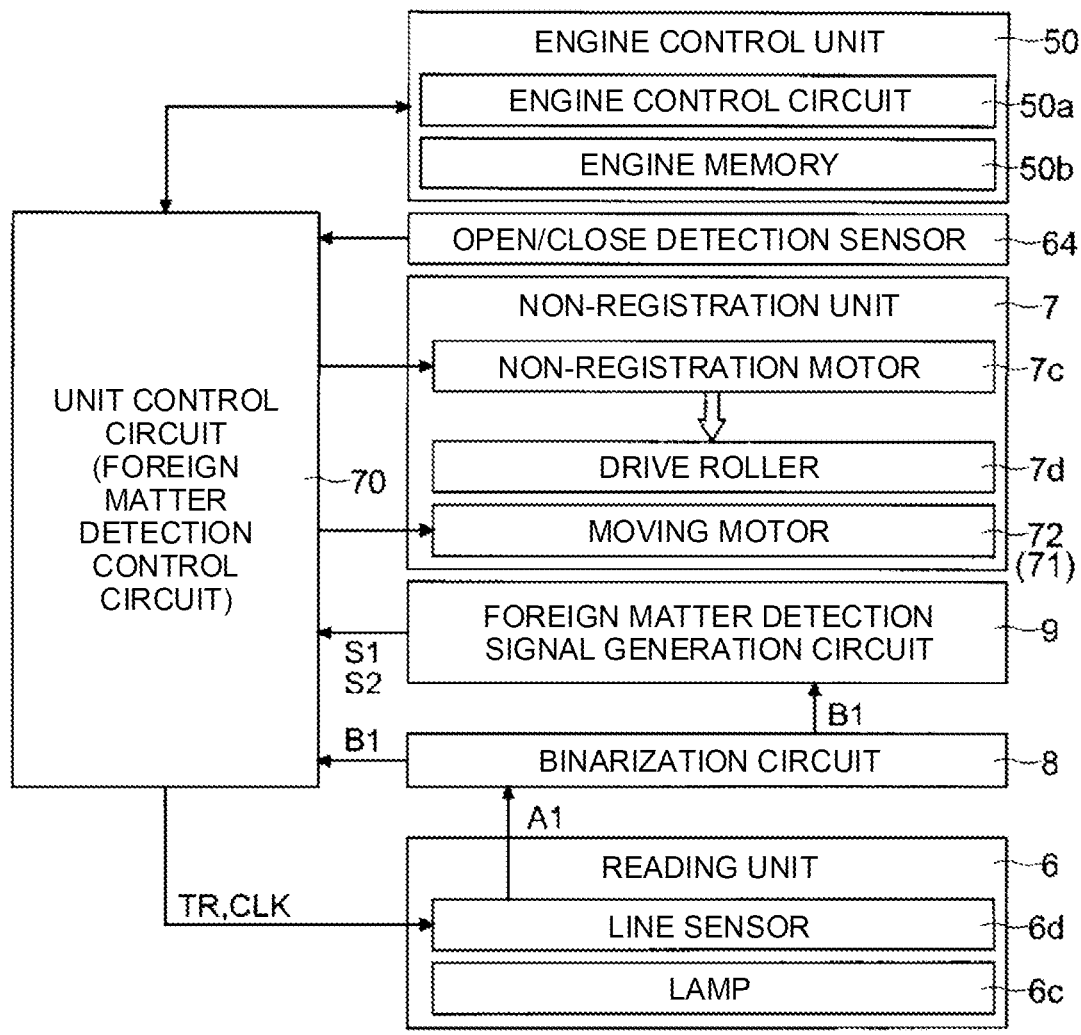
FIG. 7 is a diagram showing one example of a configuration of the complex machine according to the embodiment.

Next, one example of the reading unit 6 and a non-registration unit 7 according to the embodiment is described with reference to FIGS. 4 to 7. FIG. 4 is a diagram showing one example of an upstream portion of the image forming unit 5c according to the embodiment in the paper transport direction. FIG. 5 is a diagram showing one example of the reading unit 6 according to the embodiment. FIG. 6 is a diagram showing one example of the non-registration unit 7 according to the embodiment. FIG. 7 is a diagram showing one example of a configuration of the complex machine 100 according to the embodiment.

The complex machine 100 includes the reading unit 6 and the non-registration unit 7. The reading unit 6 is provided on the paper transport path. The reading unit 6 is provided on the upstream side in the paper transport direction with respect to the image forming unit 5c (the intermediate transfer unit 5d, a transfer position of a toner image to the paper, the secondary transfer roller 57) (see FIG. 2). As shown in FIG. 5, the reading unit 6 includes a housing 6a having one surface being opened. A light transmitting plate 6b is mounted in the opening portion. The light transmitting plate 6b is a glass plate or a light transmissive resin plate. A lamp 6c and a line sensor 6d are arranged in a closed space by the housing 6a and the light transmitting plate 6b. The reading unit 6 includes the lamp 6c and the line sensor 6d. The reading unit 6 may incorporate the lamp 6c and the line sensor 6d. The reading unit 6 is a unit that reads paper to be transported by a CIS method.

As shown in FIG. 7, a unit control circuit 70 (equivalent to a foreign matter detection control circuit) is provided in the complex machine 100. For example, the unit control circuit 70 is an integrated circuit that performs control like a CPU and a microcomputer. The unit control circuit 70 controls an operation of the non-registration unit 7. In the following, an example is described in which the unit control circuit 70 also controls an operation of the reading unit 6. Note that the engine control unit 50 may control an operation of the reading unit 6. Alternatively, the engine control unit 50 may perform the following processing relating to the reading unit 6, in place of the unit control circuit 70.

FIG. 5 shows one example of a portion where the reading unit 6 is installed. FIG. 5 is a diagram when the paper transport path is viewed from a direction perpendicular to the paper transport direction. When paper is transported (when print job is performed), the unit control circuit 70 supplies electric current to the lamp 6c to turn on the lamp 6c. FIG. 5 shows an example in which the reading unit 6 includes two lamps 6c. The lamp 6c irradiates light toward a reading area of the line sensor 6d. The lamp 6c irradiates light along a main scanning direction. For example, the lamp 6c is an LED lamp.

The line sensor 6d includes a plurality of pixels (light receiving elements). The pixels (light receiving elements) are aligned in the main scanning direction. As shown in FIG. 5, light emitted from the lamp 6c and reflected on a document is incident on each pixel of the line sensor 6d. When paper is transported (when print job is performed), the unit control circuit 70 causes the line sensor 6d to read the paper.

The line sensor 6d is divided into three blocks. Each of the blocks contains pixels (light receiving elements). For convenience, the blocks are referred to as a first block 61, a second block 62, and a third block 63 in this order from one side (right side in FIG. 4) in the main scanning direction. In the complex machine 100, paper is transported by a center passing method. The paper transport unit 5b transports paper in such a way that a center of the paper transport path in the main scanning direction coincides with a center of paper in the main scanning direction. The broken line in FIG. 4 is a line indicating the center of the paper and the paper transport path in the main scanning direction.

The third block 63 is provided at a position where the center of the paper in the main scanning direction is read. The first block 61 is provided at a position where one end of the paper in the main scanning direction is read, when the paper having a maximum width in the main scanning direction is used among printable papers. As shown in FIG. 4, a reading width of the line sensor 6d is shorter than the width of printable paper having a widest width in the main scanning direction.

The unit control circuit 70 inputs a trigger signal TR and a read clock signal CLK to the line sensor 6d. The line sensor 6d includes an electric charge transfer circuit (a shift register and a transfer CCD). For example, electric charge accumulated in each pixel is transferred to the electric charge transfer circuit according to the trigger signal TR. The electric charge transfer circuit outputs an analog image signal A1 corresponding to one pixel per read clock signal CLK, while converting the electric charge into a voltage.

The non-registration unit 7 is provided at an installation position of a registration roller pair in a conventional image forming apparatus. Conventionally, the registration roller pair is stopped at the beginning of arrival of paper. Skew of the paper is corrected by abutting the paper against the stopped registration roller pair. However, when the registration roller pair is used, transport of the paper is temporarily interrupted. The non-registration unit 7 corrects the skew, while the paper is transported downstream without stopping the paper.

As shown in FIG. 2, the non-registration unit 7 is provided on the upstream side in the paper transport direction with respect to the image forming unit 5c (the intermediate transfer unit 5d, a transfer position of a toner image). The non-registration unit 7 is provided on the downstream side in the paper transport direction with respect to the reading unit 6. Therefore, the reading unit 6 can also be used as a sensor for detecting that the paper has reached the non-registration unit 7.

As shown in FIG. 6, the non-registration unit 7 includes a case 7a. In the example of FIG. 6, the case 7a is a rectangular body, wherein the main scanning direction is aligned with a longitudinal direction. The non-registration unit 7 (case 7a) includes a non-registration roller pair 7b and a non-registration motor 7c. The non-registration roller pair 7b includes a drive roller 7d and a driven roller 7e. Axial directions of the drive roller 7d and the driven roller 7e are in parallel to each other. A peripheral surface of the drive roller 7d and a peripheral surface of the driven roller 7e come into contact with each other.

A gear is provided at the other end of a rotating shaft of the drive roller 7d. The gear meshes with a gear provided on a shaft of the non-registration motor 7c. When the non-registration motor 7c is rotated, the drive roller 7d and the driven roller 7e are also rotated.

A fulcrum 7f (fulcrum axis, pivot axis) is provided at one end in the main scanning direction (direction perpendicular to the paper transport direction). The non-registration unit 7 can be pivotally moved in such a way that the other end thereof is swung around the fulcrum 7f. As shown in FIG. 4, the other end can be swung to the downstream side or the upstream side in the paper transport direction.

The complex machine 100 includes a moving mechanism 71. In order to correct skew of paper, the moving mechanism 71 moves the other end of the non-registration unit 7 (case 7a) in the paper transport direction. The moving mechanism 71 includes a member that moves the other end. For example, the moving mechanism 71 includes a moving motor 72, a drive pulley (not shown), a driven pulley (not shown), and a belt 73. For example, the moving mechanism 71 is a curved conveyor device.

The moving motor 72 is rotatable both in a forward direction and a reverse direction. The unit control circuit 70 controls the rotation of the moving motor 72. The belt 73 is wound around the drive pulley and the driven pulley. The moving motor 72 rotates the drive pulley. For example, the moving mechanism 71 is provided below the non-registration unit 7. A lower surface of the case 7a of the non-registration unit 7 is mounted (connected) to an upper surface of the belt 73 of the moving mechanism 71. A part of the belt 73 and the other end of the non-registration unit 7 (case 7a) are connected. By rotating the moving motor 72 and the drive pulley, the belt 73 circulates while making a curve. The other end of the non-registration unit 7 (case 7a) can also be moved according to the movement of the belt 73. A moving amount of the non-registration unit 7 in skew correction is not large (for example, about several millimeters). By moving the other end of the non-registration unit 7 with use of the belt 73, it is possible to correct the skew, while continuing the paper transport.

Transport-read image data are generated based on the analog image signal A1 to be output from each pixel of the reading unit 6 (line sensor 6d) (details will be described later). The unit control circuit 70 recognizes a tilt angle of the transport paper by using the transport-read image data.

(1) When paper is skew-transported in a state that the other end in the main scanning direction is on the downstream side in the paper transport direction with respect to one end.

The unit control circuit 70 moves the other end of the non-registration unit 7 in the main scanning direction downstream in the paper transport direction before the paper arrives. When the paper enters the non-registration unit 7 (a nip between the drive roller 7d and the driven roller 7e), the unit control circuit 70 moves the other end of the non-registration unit 7 in the main scanning direction upstream in the paper transport direction. The unit control circuit 70 moves the non-registration unit 7 in such a way that skew is eliminated.

(2) When paper is skew-transported in a state that the other end in the main scanning direction is on the upstream side in the paper transport direction with respect to one end.

The unit control circuit 70 moves the other end of the non-registration unit 7 in the main scanning direction upstream in the paper transport direction before the paper arrives. When the paper enters the non-registration unit 7 (a nip between the drive roller 7d and the driven roller 7e), the unit control circuit 70 moves the other end of the non-registration unit 7 in the main scanning direction downstream in the paper transport direction. The unit control circuit 70 moves the non-registration unit 7 in such a way that skew is eliminated.

(Calculation Relating to Binarization Circuit 8 and Skew)

Figure 8:
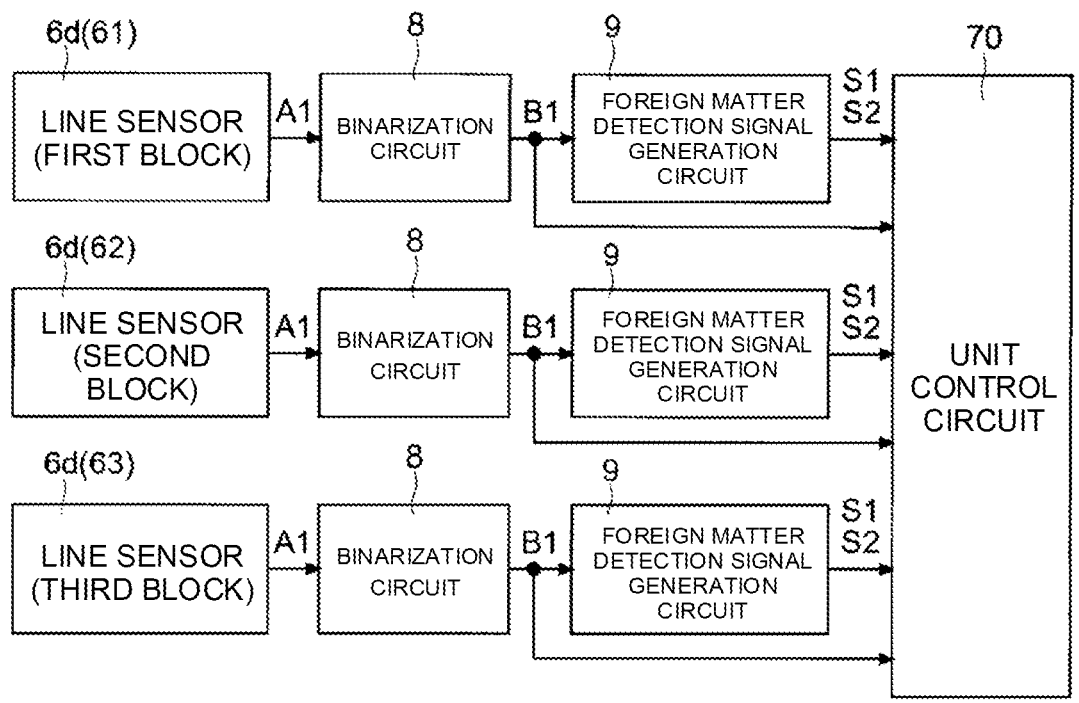
FIG. 8 is a diagram showing one example of a circuit included in the complex machine according to the embodiment.
Figure 9:
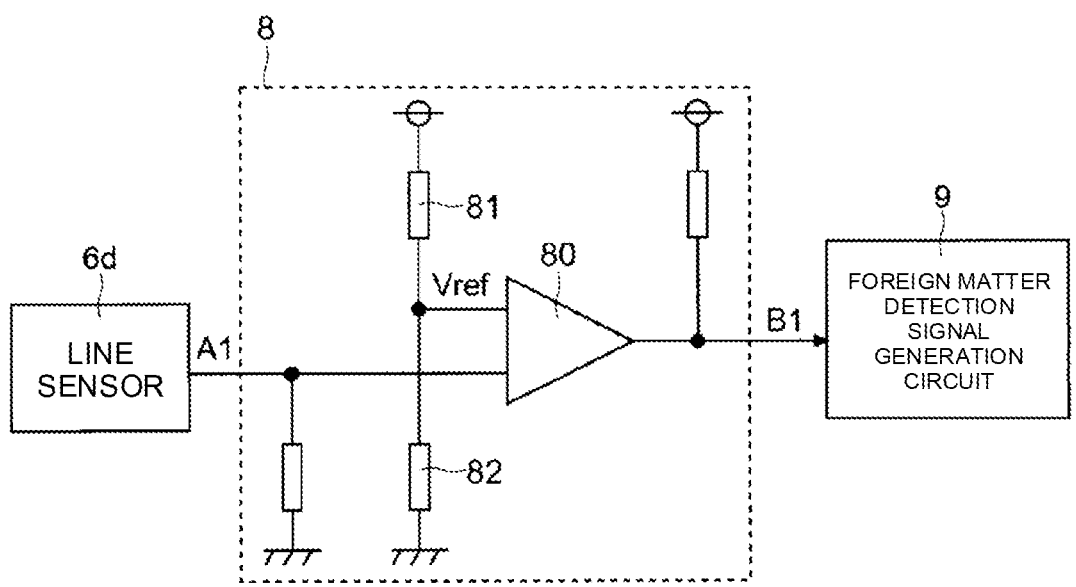
FIG. 9 is a diagram showing one example of a binarization circuit according to the embodiment.
Figure 10:
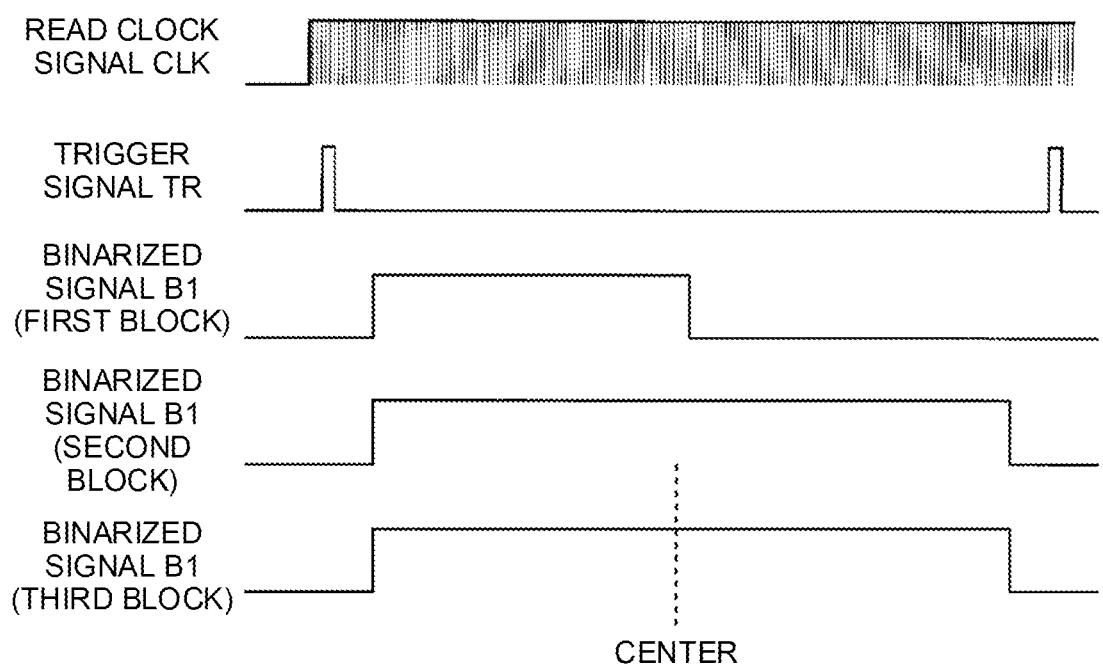
FIG. 10 is a diagram showing one example of a timing chart of each signal when the reading unit according to the embodiment reads paper.

Next, one example of calculation relating to a binarization circuit 8 and skew according to the embodiment is described with reference to FIGS. 8 to 10. FIG. 8 is a diagram showing one example of a circuit included in the complex machine 100 according to the embodiment. FIG. 9 is a diagram showing one example of the binarization circuit 8 according to the embodiment. FIG. 10 is a diagram showing one example of a timing chart of each signal when the reading unit 6 according to the embodiment reads paper.

The complex machine 100 includes the binarization circuit 8. The binarization circuit 8 is a circuit that processes an analog image signal A1 to be output from the line sensor 6d. The binarization circuit 8 outputs a high level for each analog image signal A1 corresponding to one pixel (pixel by pixel), when a voltage value of the analog image signal A1 is larger than a specific threshold value Vref. The binarization circuit 8 outputs a low level, when a voltage value of the analog image signal A1 is not larger than the threshold value Vref. It is possible to acquire monochromatic image data (1 bit per pixel) by binarization.

As described above, the line sensor 6d includes three blocks (first block 61, second block 62, third block 63). The binarization circuit 8 is provided for each block. An analog image signal A1 of each pixel in the first block 61 is input to the first binarization circuit 8. An analog image signal A1 of each pixel in the second block 62 is input to the second binarization circuit 8. An analog image signal A1 of each pixel in the third block 63 is input to the third binarization circuit 8.

Each of the binarization circuits 8 has the same configuration. FIG. 9 shows one example of the binarization circuit 8. The binarization circuit 8 includes a comparator 80 and a plurality of resistors. An output (analog image signal A1) of the line sensor 6d is input to one of input terminals of the comparator 80 in order pixel by pixel. A reference voltage (threshold value Vref) generated by separating voltages of a first resistor 81 and a second resistor 82 is input to the other input terminal of the comparator 80.

Paper reflects light of the lamp 6c, and the line sensor 6d receives the reflected light. The light of the lamp 6c is not reflected on a portion where there is no paper. Therefore, the amount of light received by a pixel read from the paper increases, and the amount of electric charge accumulated in the pixel increases. As a result, the voltage value of the analog image signal A1 of the pixel read from the paper increases. This means that the larger the voltage value of the analog image signal A1, the brighter (whiter, lighter in color) the one read by the pixel. On the contrary, the voltage value of the analog image signal A1 of the pixel not read from the paper decreases. In other words, the voltage value of the analog image signal A1 of the pixel that read from the paper becomes larger than the voltage value of the analog image signal A1 of the pixel not read from the paper.

The comparator 80 binarizes the analog image signal A1. When a voltage value of the analog image signal A1 is larger than the reference voltage, the comparator 80 outputs a high level. When a voltage value of the analog image signal A1 is not larger than the reference voltage, the comparator 80 outputs a low level. Pixels having a high level by reading the paper mean that the paper has been read.

An output (binarized signal B1) of each of the binarization circuits 8 is input to the unit control circuit 70. The unit control circuit 70 acquires binary image data (monochromatic image data, transport-read image data) generated by the binarization circuit 8. The unit control circuit 70 can recognize which pixel in each block has a high level, and which pixel in each block has a low level. The unit control circuit 70 can recognize (acquire) a tilt direction and a tilt angle of the transport paper, based on the transport-read image data.

FIG. 10 shows one example of a signal to be output from each of the binarization circuits 8 when a certain line on paper is read. In FIG. 10, the chart in the uppermost row shows a read clock signal CLK. For example, a frequency of the read clock signal CLK is several MHz or more. In FIG. 10, the chart in the second row from the top shows one example of the trigger signal TR. In FIG. 10, the chart in the third row from the top shows one example of a waveform of a binarized signal B1 of an analog image signal A1 from the first block 61. In FIG. 10, the chart in the fourth row from the top shows one example of a waveform of a binarized signal B1 of an analog image signal A1 from the second block 62. In FIG. 10, the chart in the fifth row from the top shows one example of a waveform of a binarized signal B1 of an analog image signal A1 from the third block 63. The broken line in the chart in the fifth row from the top indicates a pixel position of a center of the paper and the paper transport path in the main scanning direction.

For example, the unit control circuit 70 calculates a total value of the number of pixels (the number of read clock signals CLK) having the high level in the third-row chart, the number of pixels having the high level in the fourth-row chart, and the number of pixels having the high level on the outer side (one side) from the center in the main scanning direction in the fifth-row chart. The unit control circuit 70 calculates a multiplication value, which is acquired by multiplying the total value by the pitch corresponding to one pixel. The multiplication value indicates one-half of the length of the paper in the main scanning direction. The unit control circuit 70 can calculate the size of the paper in the main scanning direction by doubling the multiplication value.

The unit control circuit 70 can also acquire the tilt angle of the transport paper. For example, two pixels (reference point pixels) for acquiring a tilt are determined in advance. The reference point pixels are pixels by which minimum paper usable for printing can be read. For example, a distance between the reference point pixels in the main scanning direction is set smaller than one-half of the size of the minimum paper usable for printing in the main scanning direction.

When two reference point pixels reach the high level on the same line, the unit control circuit 70 recognizes the tilt angle as zero. When either of the two reference point pixels reaches the high level earlier, the unit control circuit 70 recognizes that the transport paper is tilted. When the reference point pixel on one side in the main scanning direction reaches the high level earlier, the unit control circuit 70 recognizes that one side in the main scanning direction is tilted in a direction serving as the downstream side. When the reference point pixel on the other side in the main scanning direction reaches the high level earlier, the unit control circuit 70 recognizes that the other side in the main scanning direction is tilted in a direction serving as the downstream side.

When the transport paper is tilted, the unit control circuit 70 calculates the arctangent ($\tan^{-1}$) to acquire the tilt angle. Specifically, the unit control circuit 70 performs the following calculation.

$$\text{Tilt angle} = \tan^{-1}(A/B)$$

Herein, A is a transport distance of the paper from a time when one of the reference point pixels reaches the high level until the other reference point pixel reaches the high level. For example, the unit control circuit 70 calculates A by multiplying the number of lines from a time when one of the reference point pixels reaches the high level until the other reference point pixel reaches the high level, a cycle of one line, and a paper transport speed per unit time. B is a distance between the two reference point pixels. B can be calculated by multiplying the number of pixels from the one reference point pixel to the other reference point pixel by the pitch corresponding to one pixel. The tilt angle is acquired based on a right-angled triangle having A as the height and B as the base.

When the unit control circuit 70 recognizes the tilt direction and the tilt angle, the unit control circuit 70 causes the moving mechanism 71 to move the non-registration unit 7 in the same direction as the tilt direction before the paper arrives. In addition, the unit control circuit 70 causes to move the non-registration unit 7 from a reference position by the same angle as the tilt angle. The reference position is an angle at which the non-registration unit 7 is not tilted. The reference position is a position of the non-registration unit 7 at which the main scanning direction (direction perpendicular to the paper transport direction), and axial directions of rotation axes of the non-registration roller pair 7b are in parallel. After the paper enters the non-registration unit 7 and before the paper completely passes through the non-registration unit 7, the unit control circuit 70 returns the non-registration unit 7 to a tilt-zero position (reference position). This allows skew correction without stopping the paper.

(Foreign Matter Detection Signal Generation Circuit 9)

Figure 11:
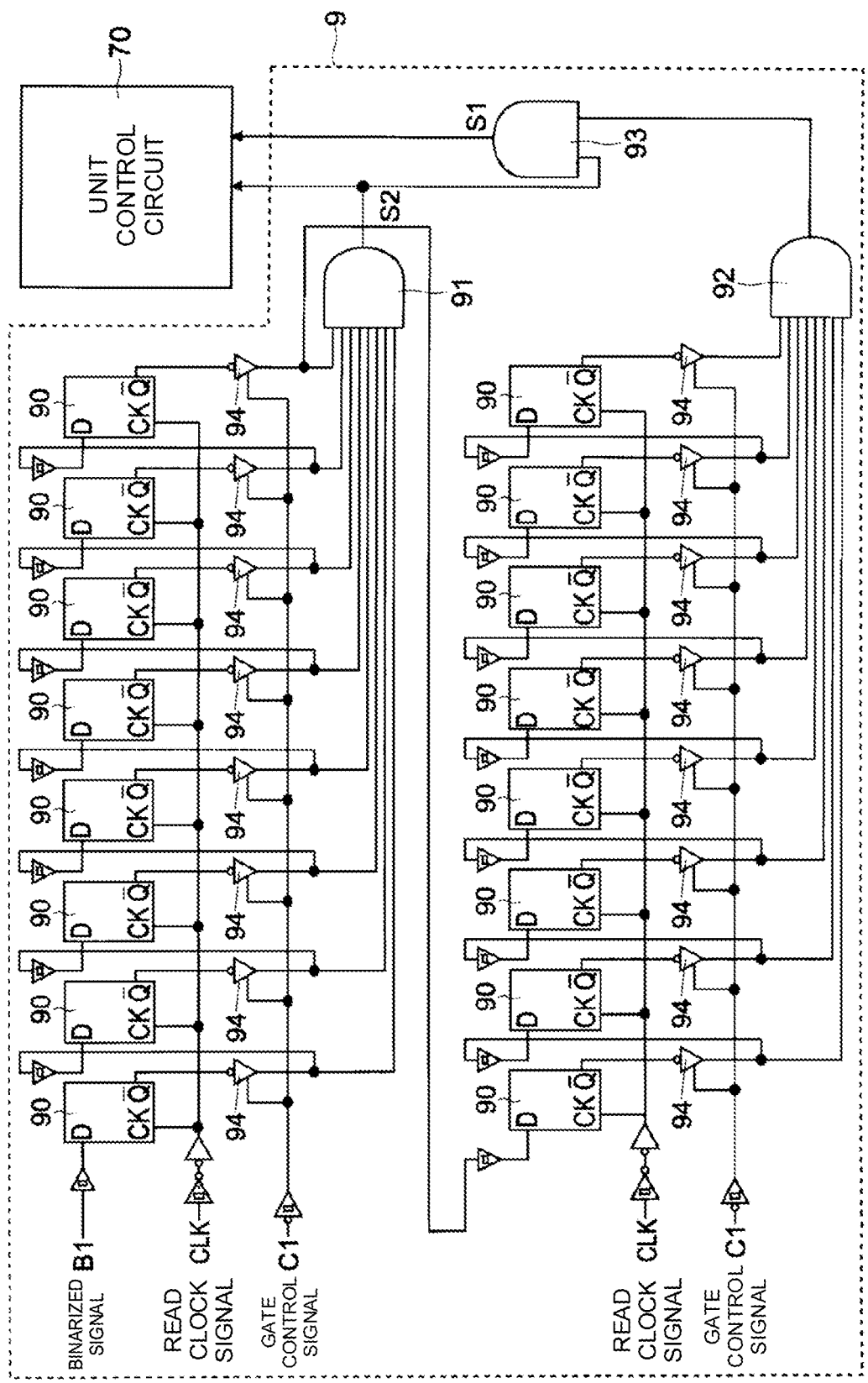
FIG. 11 is a diagram showing one example of a foreign matter detection signal generation circuit according to the embodiment.

Next, one example of a foreign matter detection signal generation circuit 9 according to the embodiment is described with reference to FIGS. 8 and 11. FIG. 11 is a diagram showing one example of the foreign matter detection signal generation circuit 9 according to the embodiment.

Foreign matter may adhere to the reading unit 6 (light transmitting plate 6b). For example, foreign matter is paper dust and toner. Paper dust adheres to the paper. Printing is performed by using toner. Therefore, paper dust and toner may adhere to the light transmitting plate 6b. Paper fibers may be entangled, and paper dust may be solidified, thus making foreign matter large. Paper dust may be entangled with toner.

The line sensor 6d of the reading unit 6 receives reflected light. Foreign matter such as paper dust also reflects light from the lamp 6c. Due to the foreign matter, a portion where there is no paper may be erroneously recognized as a portion where there is paper. In addition, there is a risk that the tilt angle is erroneously recognized. In particular, when the size of foreign matter is large, erroneous recognition is likely to occur.

It is preferable to detect adhesion of foreign matter to the reading unit 6 (light transmitting plate 6b). In view of the above, the complex machine 100 includes the foreign matter detection signal generation circuit 9. The foreign matter detection signal generation circuit 9 generates a first foreign matter detection signal S1 and a second foreign matter detection signal S2, based on an analog image signal A1 to be output from the line sensor 6d. Specifically, a binarized signal B1 of the binarization circuit 8 (comparator 80) is input to the foreign matter detection signal generation circuit 9. The first foreign matter detection signal S1 and the second foreign matter detection signal S2 are signals indicating the presence or absence of foreign matter at a reading position of the line sensor 6d.

As described above, the line sensor 6d includes three blocks (first block 61, second block 62, third block 63). The foreign matter detection signal generation circuit 9 is provided for each of the binarization circuits 8. An output signal of the binarization circuit 8 in the first block 61 is input to the first foreign matter detection signal generation circuit 9. An output signal of the binarization circuit 8 in the second block 62 is input to the second foreign matter detection signal generation circuit 9. An output signal of the binarization circuit 8 in the third block 63 is input to the third foreign matter detection signal generation circuit 9.

A signal to be output from each of the foreign matter detection signal generation circuits 9 is input to the unit control circuit 70. The unit control circuit 70 can recognize a block in which foreign matter is present.

When there is no paper on a reading line of the reading unit 6 (when paper is not read), light from the lamp 6c is not reflected on a portion where there is no foreign matter. Therefore, a voltage value of the analog image signal A1 of a pixel that does not read foreign matter (pixel on a portion where there is no foreign matter) becomes small. The voltage value of the analog image signal A1 of the pixel that does not read foreign matter indicates that the portion is dark (black, dense in color). On the other hand, a voltage value of the analog image signal A1 of a pixel that reads foreign matter (pixel on a portion where there is foreign matter) becomes large. The voltage value of the analog image signal A1 of the pixel that reads foreign matter becomes a value indicating that the portion is bright (white, light in color).

A pixel (light receiving element) that reads foreign matter receives a large amount of light. The electric charge accumulated in the pixel increases. A pixel (light receiving element) that does not read foreign matter receives a small amount of light. The electric charge accumulated in the pixel decreases. The level (voltage value) of the analog image signal A1 of the pixel that reads foreign matter becomes larger than the level of the analog image signal A1 of the pixel that does not read foreign matter. The comparator 80 binarizes the analog image signal A1. When a high level is output in a state that paper is not read, the high level means that foreign matter has been read.

FIG. 11 shows one example of one foreign matter detection signal generation circuit 9. The foreign matter detection signal generation circuit 9 includes a plurality of D flip-flops 90. FIG. 11 shows an example in which the foreign matter detection signal generation circuit 9 includes sixteen D flip-flops 90. The D flip-flops 90 are connected in multiple stages. In the following explanation, the number of D flip-flops 90 included in one foreign matter detection signal generation circuit 9 is referred to as a first consecutive number.

A binarized signal B1 (a signal based on an analog image signal A1) is input to the first-stage D flip-flop 90. Specifically, an output terminal of the comparator 80 of the binarization circuit 8 associated with the first block 61 is connected to a data input terminal of the first-stage D flip-flop 90 of the foreign matter detection signal generation circuit 9 for the first block 61. An output terminal of the comparator 80 of the binarization circuit 8 associated with the second block 62 is connected to a data input terminal of the first-stage D flip-flop 90 of the foreign matter detection signal generation circuit 9 for the second block 62. An output terminal of the comparator 80 of the binarization circuit 8 associated with the third block 63 is connected to a data input terminal of the first-stage D flip-flop 90 of the foreign matter detection signal generation circuit 9 for the third block 63. The first-stage D flip-flop 90 can be said to be a circuit that latches (stores) transport-read image data.

Then, the output of the D flip-flop 90 in the previous stage is input to the D flip-flop 90 in the next stage. In other words, the data input terminal of the D flip-flop 90 in the next stage (n-th stage) is connected to the output terminal of the D flip-flop 90 in the previous stage ((n−1)-th stage). The D flip-flop 90 in the second and subsequent stages can be said to be a circuit that latches (stores) data to be output from the previous stage. FIG. 11 shows the foreign matter detection signal generation circuit 9 in which the total number (first consecutive number) of D flip-flops 90 is sixteen. The number of D flip-flops 90 is not limited to sixteen. The number is adjusted according to resolution of the line sensor 6d. In other words, FIG. 11 shows one example of a shift register circuit in which sixteen D flip-flops 90 are connected in multiple stages.

The unit control circuit 70 inputs a read clock signal CLK to each of the D flip-flops 90. The read clock signal CLK is a signal for use in transfer (output) of the analog image signal A1 on the line sensor 6d. Each of the D flip-flops 90 latches data, based on the read clock signal CLK. Each of the D flip-flops 90 stores a signal level (a high level or a low level) of a data input terminal when the read clock signal CLK rises or falls.

The level of a signal to be output from an output terminal (/Q terminal, inverted output terminal) of each of the D flip-flops 90 becomes a level in which the logic of the stored signal level (latched data) is inverted. One NOT circuit 94 is connected to an output terminal of each of the D flip-flops 90. When the output terminal is at the high level, the NOT circuit 94 outputs the low level. When the output terminal is at the low level, the NOT circuit 94 outputs the high level. Logic inversion by the inverted output terminal, and logic inversion by the NOT circuit 94 are performed. Finally, the level of the signal to be input to the D flip-flop 90 in the next stage coincides with the level stored in the D flip-flop 90 in the previous stage.

Therefore, when the level stored in the D flip-flop 90 reaches the low level, a signal of the low level is input to the input terminal of the D flip-flop 90 in the next stage. When the level stored in the D flip-flop 90 reaches the high level, a signal of the high level is input to the input terminal of the D flip-flop 90 in the next stage. Note that a Q terminal (non-inverted output terminal) may be used as the output terminal of each of the D flip-flops 90. In this case, the NOT circuit 94 Is unnecessary.

A gate control signal C1 is input to each of the NOT circuits 94. For example, the unit control circuit 70 inputs the gate control signal C1. The gate control signal C1 is a signal for switching ON/OFF of an operation of the NOT circuit 94. When detecting foreign matter, the unit control circuit 70 sets the level of the gate control signal C1 to a level at which the NOT circuit 94 operates.

Specifically, the unit control circuit 70 detects foreign matter at a specific time. For example, when the unit control circuit 70 is newly activated, the unit control circuit 70 detects foreign matter. For example, the unit control circuit 70 is newly activated when main power supply of the complex machine 100 is newly turned on. Also, when the mode of the complex machine 100 returns from a power saving mode to an active mode (normal mode), the unit control circuit 70 is newly activated.

In addition, the complex machine 100 is provided with a cleaning cover that can be opened when the reading unit 6 is cleaned. When cleaning, the user opens the cleaning cover. The user performs cleaning work in a state that the cleaning cover is opened. For example, the user wipes off foreign matter from the surface of the light transmitting plate 6b of the reading unit 6 with a cloth or a brush in the cleaning work. After the cleaning work, the user closes the cleaning cover. The complex machine 100 may include an open/close detection sensor 64 that detects whether the cleaning cover is opened or closed (see FIG. 7). An output of the open/close detection sensor 64 may be input to the unit control circuit 70. In this case, the unit control circuit 70 can recognize opening and closing of the cleaning cover. The unit control circuit 70 may detect foreign matter when the cleaning cover is opened and closed.

In addition, the unit control circuit 70 may detect foreign matter before a print job is started. The unit control circuit 70 may detect foreign matter between transports of paper (during a time when the reading unit 6 does not face paper) in a print job.

In the foreign matter detection processing, for example, the unit control circuit 70 causes the reading unit 6 to read one line (or several lines). A signal (binarized signal B1) based on the analog image signal A1 acquired by reading for foreign matter detection is input to the foreign matter detection signal generation circuit 9. The unit control circuit 70 monitors levels of the first foreign matter detection signal S1 and the second foreign matter detection signal S2 during a period from a time when a binarized signal B1 of the first pixel is input to the foreign matter detection signal generation circuit 9 until a binarized signal B1 of the last pixel is input to the foreign matter detection signal generation circuit 9. In this case, the unit control circuit 70 is only required to monitor the level of each of the foreign matter detection signals during a reading period for one line.

The foreign matter detection signal generation circuit 9 includes a first AND circuit 91. The first AND circuit 91 receives an output of each of the D flip-flops 90 of the same number as a second consecutive number, which is continued from the first stage. In the example of FIG. 11, the second consecutive number is 8. In other words, the first AND circuit 91 receives an output of each of the D flip-flops 90 from the first stage to the eighth stage.

The second consecutive number is not limited to 8. The value of the second consecutive number is determined as necessary. The second consecutive number is an integer less than the first consecutive number. FIG. 11 shows an example in which one-half of the first consecutive number is set as the second consecutive number. The second consecutive number may be larger than one-half of the first consecutive number. The second consecutive number may be less than one-half of the first consecutive number.

A signal to be output from the first AND circuit 91 is input to the unit control circuit 70 as the second foreign matter detection signal S2. When all the D flip-flops 90 (D flip-flops 90 of the second consecutive number) to be connected to the first AND circuit 91 output the high level, the level of the output terminal of the first AND circuit 91 reaches the high level. In other words, when a pixel that reads foreign matter continues by the second consecutive number, the foreign matter detection signal generation circuit 9 sets the level of the second foreign matter detection signal S2 to the high level. In the case of FIG. 11, when a pixel in which the amount of received light is increased by reading foreign matter continues by 8 pixels, the level of the second foreign matter detection signal S2 reaches the high level.

On the other hand, even if foreign matter is read, when the number of consecutive pixels that read foreign matter is less than the second consecutive number, the foreign matter detection signal generation circuit 9 maintains the level of the second foreign matter detection signal S2 at the low level. In the case of FIG. 11, when the size of the read foreign matter in the main scanning direction is less than the pitch corresponding to 8 pixels, the level of the second foreign matter detection signal S2 is maintained at the low level.

When the paper is not being read, the level of a binarized signal B1 may reach the high level in response to paper dust having a size of about 1 pixel. It is difficult to determine whether foreign matter having a size of about 1 pixel is foreign matter for which cleaning is necessary. If cleaning is requested to the user just because the level of the binarized signal B1 instantaneously reaches the high level for a period corresponding to one pixel by reading for foreign matter detection, the frequency of cleaning requests may become too high. The user may be forced to perform cleaning work many times, because the sensitivity of foreign matter detection is too high.

In view of the above, when a pixel continues by the second consecutive number, and the level of the binarized signal B1 reaches the high level, the level of the second foreign matter detection signal S2 is set to the high level. This allows lowering the sensitivity of foreign matter detection, and suppresses a high frequency of cleaning requests.

The foreign matter detection signal generation circuit 9 includes a second AND circuit 92 and a third AND circuit 93. The second AND circuit 92 receives an output of each of the D flip-flops 90 whose output terminals are not connected to the first AND circuit 91. The second AND circuit 92 receives an output of each of the D flip-flops 90 from the D-flip-flop 90 in a stage of a number larger than the second consecutive number by one to the D flip-flop 90 in the final stage. In the example of FIG. 11, the second AND circuit 92 receives an output of each of the D flip-flops 90 from the 9th to 16th stages.

The third AND circuit 93 has two input terminals. One of the input terminals is connected to the output terminal of the first AND circuit 91. The other input terminal is connected to the output terminal of the second AND circuit 92. In other words, the third AND circuit 93 receives outputs of the first AND circuit 91 and the second AND circuit 92. The level of a signal to be output from the third AND circuit 93 becomes a logical product of the output of the first AND circuit 91 and the output of the second AND circuit 92. The output of the third AND circuit 93 is input to the unit control circuit 70 as the first foreign matter detection signal S1.

Specifically, when all the D flip-flops 90 (D flip-flops 90 of the first consecutive number) included in one foreign matter detection signal generation circuit 9 store the high level, the level of the output terminal of the third AND circuit 93 (first foreign matter detection signal S1) reaches the high level. In other words, when a pixel that reads foreign matter continues by the first consecutive number, the foreign matter detection signal generation circuit 9 sets the level of the first foreign matter detection signal S1 to the high level. In the case of FIG. 11, when a pixel in which the amount of received light increases by reading foreign matter continues by 16 pixels, the level of the first foreign matter detection signal S1 reaches the high level. This allows lowering the sensitivity of foreign matter detection, and also allows detection of large foreign matter to some extent.

On the other hand, even if foreign matter is read, when the number of consecutive pixels that read foreign matter is less than the first consecutive number, the foreign matter detection signal generation circuit 9 maintains the level of the first foreign matter detection signal S1 at the low level. In the case of FIG. 11, when the size of the read foreign matter in the main scanning direction is shorter than the length of 16 times of the pitch corresponding to one pixel, the level of the first foreign matter detection signal S1 is maintained at the low level.

(Processing in Foreign Matter Detection)

Figure 12:
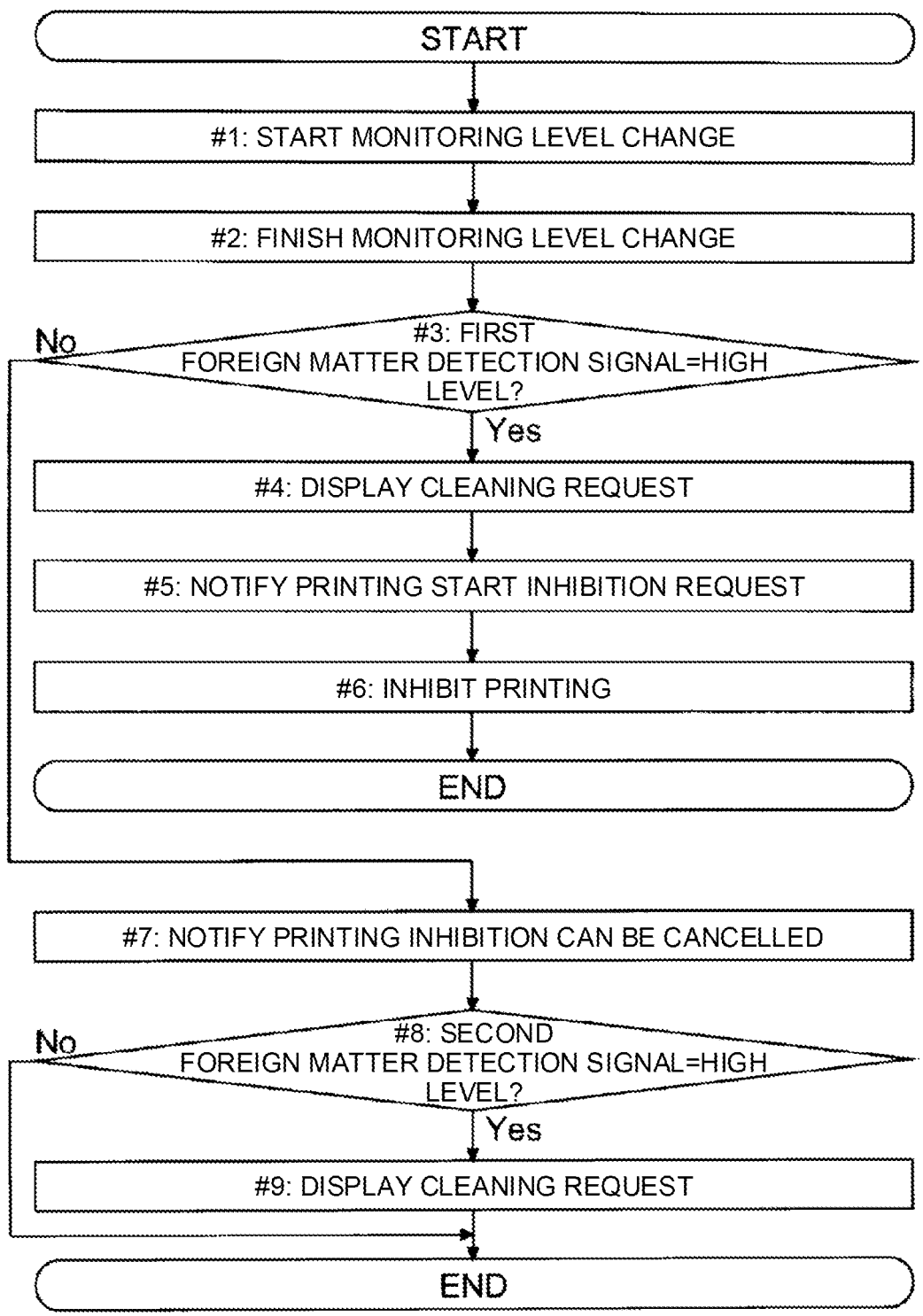
FIG. 12 is a diagram showing one example of processing by the complex machine according to the embodiment at the time of foreign matter detection.

One example of processing by the complex machine 100 according to the embodiment at the time of foreign matter detection is described with reference to FIG. 12. FIG. 12 is a diagram showing one example of processing by the complex machine 100 according to the embodiment at the time of foreign matter detection.

The start in FIG. 12 is a time when the unit control circuit 70 causes the reading unit 6 (line sensor 6d) to start reading for foreign matter detection. The unit control circuit 70 starts monitoring level changes of the first foreign matter detection signal S1 and the second foreign matter detection signal S2 (step #1). For example, the unit control circuit 70 starts monitoring according to an output of a binarized signal B1 based on an analog image signal A1 acquired by reading one line by the reading unit 6. The unit control circuit 70 monitors the levels of the first foreign matter detection signal S1 and the second foreign matter detection signal S2 to be output from each of the foreign matter detection signal generation circuits 9. In the complex machine 100, the unit control circuit 70 monitors the levels of six signal lines.

Then, the unit control circuit 70 finishes monitoring of the level changes of the first foreign matter detection signal S1 and the second foreign matter detection signal S2 (step #2). For example, when all the binarized signals B1 based on the analog image signals A1 acquired by reading one line for foreign matter detection are input to the foreign matter detection signal generation circuit 9, the unit control circuit 70 finishes the monitoring.

The unit control circuit 70 checks whether the first foreign matter detection signal S1 reaches the high level in any one of the foreign matter detection signal generation circuits 9 (step #3). The unit control circuit 70 recognizes that foreign matter is adhered to a block associated with the foreign matter detection signal generation circuit 9 in which the first foreign matter detection signal reaches the high level.

When the first foreign matter detection signal S1 reaches the high level in any one of the foreign matter detection signal generation circuits 9 (Yes in step #3), the unit control circuit 70 causes the display panel 41 to display a cleaning message for the reading unit 6 (step #4). For example, the unit control circuit 70 transmits, to the control unit 1, a request for displaying the cleaning message on the display panel 41. When receiving the display request, the control unit 1 causes the display panel 41 to display the cleaning message. For example, the control unit 1 causes to display a cleaning message such as "Open the cover, and clean the reading unit.". The unit control circuit 70 may notify the control unit 1 of a block of the line sensor 6d in which the first foreign matter detection signal S1 reaches the high level. In this case, the control unit 1 may cause the display panel 41 to display in which block of the line sensor 6d, foreign matter is present.

In addition, the unit control circuit 70 notifies the engine control unit 50 and the control unit 1 of a printing inhibition request (step #5). When receiving the printing inhibition request, the control unit 1 and the engine control unit 50 inhibit printing. (step #6→*End). The control unit 1 and the engine control unit 50 bring the complex machine 100 to a printing inhibition state.

When receiving the printing inhibition request while a print job is being performed, the control unit 1 and the engine control unit 50 stop the operation of the printing unit 5. When receiving the printing inhibition request while a print job is not being performed, the control unit 1 and the engine control unit 50 do not allow the printing unit 5 to perform a new print job. This is because the foreign matter is large and the image quality of a printed matter may deteriorate.

The control unit 1 and the engine control unit 50 maintain the printing inhibition state of the printing unit 5 and the complex machine 100 until a notification to be described later is received. When the user wants to cancel the printing inhibition state, the user cleans the reading unit 6. Foreign matter detection is re-executed again after the cleaning cover is opened and closed. As far as the first foreign matter detection signal S1 does not reach the high level after the re-execution, the control unit 1 and the engine control unit 50 cancel the printing inhibition state.

Specifically, when the first foreign matter detection signal S1 does not reach the high level in any one of the foreign matter detection signal generation circuits 9 (No in step #3), the unit control circuit 70 notifies the engine control unit 50 and the control unit 1 that printing inhibition can be cancelled (step #7). When the printing unit 5 and the complex machine 100 are in a printing inhibition state at the time of receiving the notification, the control unit 1 and the engine control unit 50 cancel the printing inhibition state of the printing unit 5 and the complex machine 100. When receiving a request for a new print job, the control unit 1 and the engine control unit 50 cause the printing unit 5 to perform the new print job.

Then, the unit control circuit 70 checks whether the second foreign matter detection signal S2 reaches the high level in any one of the foreign matter detection signal generation circuits 9 (step #8). When the second foreign matter detection signal S2 reaches the high level in any one of the foreign matter detection signal generation circuits 9 (Yes in step #8), the unit control circuit 70 causes the display panel 41 to display a cleaning message for the reading unit 6 (step #9). This is because foreign matter of a certain large size adheres to the light transmitting plate 6b of the reading unit 6.

For example, the unit control circuit 70 transmits, to the control unit 1, a request for displaying a cleaning message on the display panel 41. When receiving the display request, the control unit 1 causes the display panel 41 to display the cleaning message. The cleaning message is a message requesting for cleaning the reading unit 6. For example, the control unit 1 causes to display a message such as "Open the cover and clean the reading unit.", as a cleaning message. Note that the unit control circuit 70 may notify the control unit 1 of a block of the line sensor 6d in which the second foreign matter detection signal S2 reaches the high level. In this case, the control unit 1 may cause the display panel 41 to display in which block of the line sensor 6d, foreign matter is present.

When the second foreign matter detection signal S2 does not reach the high level in any one of the foreign matter detection signal generation circuits 9 (No in step #8), or after step #9, the unit control circuit 70 finishes the present flowchart (end). Even when the second foreign matter detection signal S2 reaches the high level, as far as the first foreign matter detection signal S1 does not reach the high level, the unit control circuit 70 does not bring the complex machine 100 to a printing inhibition state. Considering usability of the user, the unit control circuit 70 prevents printing from being inhibited when only the second foreign matter detection signal S2 is at the high level.

In this way, the image forming apparatus (complex machine 100) according to the embodiment includes the paper transport unit 5b, the image forming unit 5c, the reading unit 6, the foreign matter detection signal generation circuit 9, and the foreign matter detection control circuit (unit control circuit 70). The paper transport unit 5b transports paper. The image forming unit 5c forms an image. The reading unit 6 includes the lamp 6c, and the line sensor 6d for reading the transport paper. The reading unit 6 is provided on the upstream side in the paper transport direction with respect to the image forming unit 5c. The foreign matter detection signal generation circuit 9 generates the first foreign matter detection signal S1, based on the analog image signal A1 to be output from the line sensor 6d. The foreign matter detection control circuit receives the first foreign matter detection signal S1. The foreign matter detection control circuit recognizes the presence or absence of foreign matter in the reading unit 6, based on the level of the first foreign matter detection signal S1. In the foreign matter detection processing, when a pixel that reads foreign matter continues by the specific first consecutive number or more in a signal based on the analog image signal A1 of each pixel to be output from the line sensor 6d, the foreign matter detection signal generation circuit 9 sets the level of the first foreign matter detection signal S1 to a level indicating the presence of foreign matter. Even if there is a pixel that reads foreign matter in a signal based on the analog image signal A1 of each pixel to be output from the line sensor 6d, when a pixel that reads foreign matter does not continue by the first consecutive number or more, the foreign matter detection signal generation circuit 9 sets the level of the first foreign matter detection signal S1 to a level indicating the absence of foreign matter.

Even if there is a pixel that reads foreign matter by coincidence, the level of the first foreign matter detection signal S1 is maintained at the level indicating the absence of foreign matter unless pixels are continued. Therefore, it is possible to reduce the number of level changes of the first foreign matter detection signal S1. This makes it possible to reduce processing load of the foreign matter detection control circuit. It is not necessary to adopt a high-speed, expensive foreign matter detection control circuit. This makes it possible to expand the choice of the foreign matter detection control circuit. This makes it possible to suppress the manufacturing cost of the image forming apparatus.

When the number of consecutive pixels that read foreign matter exceeds the first consecutive number, the level of the first foreign matter detection signal S1 can be changed to the level indicating the presence of foreign matter. This makes it possible to accurately detect the presence of foreign matter (large foreign matter), which is likely to cause erroneous detection of a paper transport state. On the other hand, it is possible to ignore minute foreign matter, which is unlikely to cause erroneous detection of a paper transport state. Therefore, when foreign matter is small, it is possible not to request cleaning work. This makes it possible to prevent the frequency of requesting cleaning work from becoming too high.

The image forming apparatus includes the display panel 41 that displays a message requesting cleaning of the reading unit 6 when the level of the first foreign matter detection signal S1 reaches the level indicating the presence of foreign matter. This allows the user to urge removing large foreign matter adhering to the reading unit 6 (light transmitting plate 6b).

When the level of the first foreign matter detection signal S1 reaches the level indicating the presence of foreign matter when printing, the image forming unit 5c stops image forming. The paper transport unit 5b stops paper transport. When the level of the first foreign matter detection signal S1 reaches the level indicating the presence of foreign matter when not printing, the image forming unit 5c does not newly start image forming. The paper transport unit 5b does not newly start paper transport. This allows not to perform printing, when there is a possibility of image quality deterioration due to large foreign matter.

The reading unit 6 outputs the analog image signal A1 pixel by pixel in the pixel arrangement order, based on the read clock signal CLK. The foreign matter detection signal generation circuit 9 includes the D flip-flops 90 of the same number as the first consecutive number. Each of the D-flip-flops 90 latches data based on the read clock signal CLK to be input. A signal based on the analog image signal A1 is input to the input terminal of the first-stage D flip-flop 90. The output terminal of the D flip-flop 90 in the previous stage is connected to the input terminal of the D flip-flop 90 in the next stage. When outputs of all the D flip-flops 90 reach the level indicating the presence of foreign matter, the foreign matter detection signal generation circuit 9 sets the level of the first foreign matter detection signal S1 at the level indicating the presence of foreign matter. Using the plurality of D flip-flops 90 makes it possible to prevent the level of the first foreign matter detection signal S1 from changing just because minute foreign matter is read. This makes it possible to reduce the number of large level changes of the foreign matter detection signal S1. This makes it possible to achieve the foreign matter detection signal generation circuit 9 by using an easily available member.

The image forming apparatus includes the binarization circuit 8 to which the analog image signal A1 of each pixel is input. The binarized signal B1 acquired by binarizing the analog image signal A1 by the binarization circuit 8 is input to the input terminal of the first-stage D flip-flop 90. The analog image signal A1 can be binarized. By binarization, the first-stage D flip-flop 90 can accurately latch the input value. This makes it possible to accurately detect that the number of consecutive pixels that read foreign matter exceeds the first consecutive number.

In the foreign matter detection processing, the foreign matter detection signal generation circuit 9 generates the second foreign matter detection signal S2. When a pixel that reads foreign matter continues by the specific second consecutive number or more in the input analog image signal A1, the foreign matter detection signal generation circuit 9 sets the level of the second foreign matter detection signal S2 to the level indicating the presence of foreign matter. Even if there is a pixel that reads foreign matter in the input analog image signal A1, when a pixel that reads foreign matter does not continue by the specific second consecutive number or more, the foreign matter detection signal generation circuit 9 sets the level of the second foreign matter detection signal S2 to the level indicating the absence of foreign matter. The second consecutive number is less than the first consecutive number. This makes it possible to detect adhesion of foreign matter of a certain large size, although the level of the first foreign matter detection signal S1 does not change. This makes it possible to detect adhesion of foreign matter of a size, for which is preferable to request cleaning work.

The image forming apparatus includes the display panel 41 that displays a message requesting cleaning of the reading unit 6 when the level of the second foreign matter detection signal S2 reaches the level indicating the presence of foreign matter. This makes it possible to urge the user to remove foreign matter adhering to the reading unit 6 and having a certain large size.

Even if the level of the second foreign matter detection signal S2 reaches the level indicating the presence of foreign matter when printing, the image forming unit 5c continues image forming. The paper transport unit 5b continues paper transport. Even if the level of the second foreign matter detection signal S2 reaches the level indicating the presence of foreign matter when not printing, the image forming unit 5c newly starts image forming. The paper transport unit 5b newly starts paper transport. This makes it possible to perform printing, when foreign matter is not so large to change the level of the first foreign matter detection signal S1. As far as foreign matter is not so large, it is possible to continue using the image forming apparatus. This makes it possible to provide a user-friendly image forming apparatus.

The foreign matter detection signal generation circuit 9 includes the first AND circuit 91. The reading unit 6 outputs the analog image signal A1 pixel by pixel in the pixel arrangement order, based on the read clock signal CLK. The foreign matter detection signal generation circuit 9 includes the D flip-flops 90 of the same number as the first consecutive number. Each of the D flip-flops 90 latches data based on the read clock signal CLK to be input. A signal based on the analog image signal A1 is input to the input terminal of the first-stage D flip-flop 90. The output terminal of the D flip-flop 90 in the previous stage is connected to the input terminal of the D flip-flop 90 in the next stage. The first AND circuit 91 receives an output of each of the D flip-flops 90 of the same number as the second consecutive number in order from the first stage. A signal to be output from the first AND circuit 91 is the second foreign matter detection signal S2. It is possible to achieve a circuit that generates the second foreign matter detection signal S2 only by the D flip-flops 90 and the AND circuit.

The foreign matter detection signal generation circuit 9 includes the second AND circuit 92 and the third AND circuit 93. The second AND circuit 92 receives each of the outputs of the D flip-flops 90 whose output terminals are not connected to the first AND circuit 91. The third AND circuit 93 receives an output of the first AND circuit 91 and an output of the second AND circuit 92. A signal to be output from the third AND circuit 93 is the first foreign matter detection signal S1. It is possible to achieve a circuit that generates two types of foreign matter detection signals only by the D flip-flops 90 and the three AND circuits.

The image forming apparatus (complex machine 100) includes the non-registration unit 7 provided on the upstream side in the paper transport direction with respect to the image forming unit 5c and on the downstream side in the paper transport direction with respect to the reading unit 6, and the unit control circuit 70. The non-registration unit 7 includes the non-registration roller pair 7b, the non-registration motor 7c, the case 7a, and the moving mechanism 71. The non-registration roller pair 7b feeds paper toward the image forming unit 5c. The non-registration motor 7c rotates the non-registration roller pair 7b. The case 7a accommodates the non-registration roller pair 7b, and has the fulcrum 7f provided at one end in the main scanning direction. The moving mechanism 71 moves the other end of the case 7a in the paper transport direction around the fulcrum 7f. The unit control circuit 70 recognizes the tilt angle of the transport paper by using the transport-read image data generated based on the analog image signal A1. The unit control circuit 70 causes the moving mechanism 71 to move the non-registration unit 7 for skew correction. This makes it possible to correct skew of the transport paper, based on the transport-read image data acquired by reading with use of the reading unit 6. This makes it possible to detect foreign matter that impairs accurate skew correction.

In the foregoing, an embodiment according to the present disclosure has been described. However, the scope of the present disclosure is not limited to the above. The present disclosure can be carried out by adding various modifications within the spirit of the present disclosure.

The present disclosure is applicable to an image forming apparatus including a reading unit that reads transport paper.

What is claimed is:

1. An image forming apparatus comprising:
   a paper transport unit that transports paper;
   an image forming unit that forms an image;
   a reading unit including a lamp, and a line sensor for reading transport paper, and provided on an upstream side in a paper transport direction with respect to the image forming unit;
   a foreign matter detection signal generation circuit that generates a first foreign matter detection signal, based on an analog image signal to be output from the line sensor; and
   a foreign matter detection control circuit that receives the first foreign matter detection signal, and recognizes the presence or absence of foreign matter in the reading unit, based on a level of the first foreign matter detection signal, wherein
   in foreign matter detection processing,
   when a pixel that reads foreign matter continues by a specific first consecutive number or more in a signal based on the analog image signal of each pixel to be output from the line sensor, the foreign matter detection signal generation circuit sets a level of the first foreign matter detection signal to a level indicating the presence of foreign matter, and
   even if there is a pixel that reads foreign matter in the signal based on the analog image signal of each pixel to be output from the line sensor, when a pixel that reads foreign matter does not continue by the first consecutive number or more, the foreign matter detection signal generation circuit sets a level of the first foreign matter detection signal to a level indicating the absence of foreign matter.

2. The image forming apparatus according to claim 1, further comprising a display panel that displays a message requesting cleaning of the reading unit, when a level of the first foreign matter detection signal reaches the level indicating the presence of foreign matter.

3. The image forming apparatus according to claim 1, wherein
   when a level of the first foreign matter detection signal reaches the level indicating the presence of foreign matter when printing, the image forming unit stops image forming, and the paper transport unit stops paper transport, and
   when a level of the first foreign matter detection signal reaches the level indicating the presence of foreign matter when not printing, the image forming unit does not newly start image forming, and the paper transport unit does not newly start paper transport.

4. The image forming apparatus according to claim 1, wherein
the reading unit outputs the analog image signal pixel by pixel in a pixel arrangement order, based on a read clock signal,
the foreign matter detection signal generation circuit includes D flip-flops of the same number as the first consecutive number,
each of the D flip-flops latches data based on the read clock signal to be input,
an input terminal of the D flip-flop in a first stage receives the signal based on the analog image signal,
an output terminal of the D flip-flop in a previous stage is connected to an input terminal of the D flip-flop in a next stage, and
the foreign matter detection signal generation circuit sets a level of the first foreign matter detection signal to the level indicating the presence of foreign matter, when outputs of all the D flip-flops reach the level indicating the presence of foreign matter.

5. The image forming apparatus according to claim 4, further comprising a binarization circuit to which the analog image signal of each pixel is input, wherein
the input terminal of the D flip-flop in the first stage is input to a binarized signal acquired by binarizing the analog image signal by the binarization circuit.

6. The image forming apparatus according to claim 1, wherein
in the foreign matter detection processing,
the foreign matter detection signal generation circuit generates a second foreign matter detection signal,
when a pixel that reads foreign matter continues by a specific second consecutive number or more in the input analog image signal, the foreign matter detection signal generation circuit sets a level of the second foreign matter detection signal to the level indicating the presence of foreign matter,
even if there is a pixel that reads foreign matter in the input analog image signal, when a pixel that reads foreign matter does not continue by the second consecutive number or more, the foreign matter detection signal generation circuit sets a level of the second foreign matter detection signal to the level indicating the absence of foreign matter, and
the second consecutive number is less than the first consecutive number.

7. The image forming apparatus according to claim 6, further comprising a display panel that displays a message requesting cleaning of the reading unit, when a level of the second foreign matter detection signal reaches the level indicating the presence of foreign matter.

8. The image forming apparatus according to claim 6, wherein
even if the level of the second foreign matter detection signal reaches the level indicating the presence of foreign matter when printing, the image forming unit continues image forming, and the paper transport unit continues paper transport, and
even if the level of the second foreign matter detection signal reaches the level indicating the presence of foreign matter when not printing, the image forming unit newly starts image forming, and the paper transport unit newly starts paper transport.

9. The image forming apparatus according to claim 6, further comprising a first AND circuit, wherein
the reading unit outputs the analog image signal pixel by pixel in a pixel arrangement order, based on a read clock signal,
the foreign matter detection signal generation circuit includes D flip-flops of the same number as the first consecutive number,
each of the D flip-flops latches data based on the read clock signal to be input,
an input terminal of the D flip-flop in a first stage receives the signal based on the analog image signal,
an output terminal of the D flip-flop in a previous stage is connected to an input terminal of the D flip-flop in a next stage,
the first AND circuit receives outputs of the D flip-flops of the same number as the second consecutive number in order from the first stage, and
a signal to be output from the first AND circuit is the second foreign matter detection signal.

10. The image forming apparatus according to claim 9, further comprising a second AND circuit and a third AND circuit, wherein
the second AND circuit receives an output of each of the D flip-flops whose output terminals are not connected to the first AND circuit,
the third AND circuit receives an output of the first AND circuit and an output of the second AND circuit, and
a signal to be output from the third AND circuit is the first foreign matter detection signal.

11. The image forming apparatus according to claim 1, further comprising a non-registration unit provided on an upstream side in the paper transport direction with respect to the image forming unit and on a downstream side in the paper transport direction with respect to the reading unit, and a unit control circuit, wherein
the non-registration unit includes
a non-registration roller pair that feeds the paper toward the image forming unit,
a non-registration motor that rotates the non-registration roller pair,
a case that accommodates the non-registration roller pair, and has a fulcrum at one end in a main scanning direction, and
a moving mechanism that moves the other end of the case in the paper transport direction around the fulcrum, and
the unit control circuit recognizes a tilt angle of the transport paper by using transport-read image data generated based on the analog image signal, and causes the moving mechanism to move the non-registration unit for skew correction.

* * * * *